United States Patent
Green et al.

(10) Patent No.: US 10,953,269 B2
(45) Date of Patent: Mar. 23, 2021

(54) MULTI-PURPOSE DYNAMIC EXERCISE BENCH AND SYSTEM AND METHODS THEREOF

(71) Applicants: Refael Green, Netanya (IL); Anastasia Green, Netanya (IL)

(72) Inventors: Refael Green, Netanya (IL); Anastasia Green, Netanya (IL)

( * ) Notice: Subject to any disclaimer, the term of this patent is extended or adjusted under 35 U.S.C. 154(b) by 0 days.

(21) Appl. No.: 16/466,029

(22) PCT Filed: Sep. 6, 2018

(86) PCT No.: PCT/IL2018/000007
§ 371 (c)(1),
(2) Date: Jun. 2, 2019

(87) PCT Pub. No.: WO2019/049124
PCT Pub. Date: Mar. 14, 2019

(65) Prior Publication Data
US 2020/0206562 A1 Jul. 2, 2020

Related U.S. Application Data (60) Provisional application No. 62/556,521, filed on Sep. 11, 2017.

(51) Int. Cl.
*A63B 21/00* (2006.01)
*A63B 24/00* (2006.01)
*A63B 23/02* (2006.01)

(52) U.S. Cl.
CPC ...... *A63B 21/4029* (2015.10); *A63B 21/4015* (2015.10); *A63B 23/0211* (2013.01); *A63B 24/0003* (2013.01)

(58) Field of Classification Search
CPC ....... A63B 21/4029–4031; A63B 23/02–0244; A63B 24/0087
See application file for complete search history.

(56) References Cited

U.S. PATENT DOCUMENTS 5,125,884 A * 6/1992 Weber ............... A63B 21/4029
482/142
2004/0014567 A1 * 1/2004 Mendel ............... A63B 24/00
482/8

(Continued)

FOREIGN PATENT DOCUMENTS

CN 1054457227 4/2016
JP H10230022 9/1998

OTHER PUBLICATIONS

Yao Gufeng, Translation of CN 105457227, 2016 (Year: 2016).*

*Primary Examiner* — Jennifer Robertson
(74) *Attorney, Agent, or Firm* — Haim M. Factor (57) ABSTRACT

A multi-purpose dynamic exercise bench, for performing a training program of hanging sit-ups in an exercise session, comprising: an "H"-shaped base configured to provide a stable support for the bench; an inclinable bench table having a first and second end, the bench table covered with a bench mat upon which a user lies on his back with his head oriented towards the second end and feet secured at the first end during an exercise session; a bearing support fixed upon the base, the bearing support having a table rotational bearing, the bench table positioned above and fixed to the rotational bearing near the bench table second end; an inclination piston connected to the bench table and to the base, the inclination piston operated to provide inclination of the bench table about the rotational bearing; and an interface control attached to the bench table serving to control functionality of the bench.

11 Claims, 9 Drawing Sheets

(56) References Cited

U.S. PATENT DOCUMENTS

| | | | |
|---|---|---|---|
| 2015/0057127 A1* | 2/2015 | Lagree | A63B 21/00 |
| | | | 482/4 |
| 2015/0217164 A1* | 8/2015 | Lagree | G16H 20/30 |
| | | | 434/247 |
| 2017/0007885 A1* | 1/2017 | Kerwin | G09B 5/02 |

* cited by examiner

FIG 4A – Detail A

FIG 4B – Detail B

MULTI-PURPOSE DYNAMIC EXERCISE BENCH AND SYSTEM AND METHODS THEREOF

FIELD OF THE INVENTION AND BACKGROUND

The current invention relates to sports conditioning equipment and specifically to a multi-purpose dynamic exercise bench and system and methods thereof.

In the specification and claims which follow hereinbelow, the term "bench", as used in "exercise bench", is intended to mean a structure upon which a person initially lays in a supine position, similar to lying on a bed. An exercise bench is meant to be used by a person (hereinbelow "user") for body building and/or other exercise activities, as described hereinbelow. The term "hanging sit ups", as used in the specification and claims which follow hereinbelow, is intended to mean a sit up (as known in the art) performed substantially partly or completely against gravity, meaning in an upwards direction, on an inclined/vertical surface.

The term "mobile device", as used in the specification and claims which follow hereinbelow, is intended to mean any of an array of devices including, but not limited to: sports watches; smart phones; tablet computers; and laptop computers.

The term "session" as used in "exercise session" or interchangeably "workout session" in the specification and claims which follow hereinbelow, is intended to mean a repetitive sequence of: setting an inclination position/angle; performing a plurality of exercise repetitions and/or sets of repetitions, as known in the art; and having an optional rest period, typically less than 60 seconds in duration, between sets and/or sequence repetitions.

The term "training program" as used in the specification and claims which follow hereinbelow, is intended to mean a series of workout sessions performed over time (usually over a period of at least a number of weeks) to accomplish one or more specific physical conditioning objectives.

There has been interest in sports throughout the world ever since the Greeks stressed professional sport as part of an ongoing ideological lifestyle. The twentieth century marked a dramatic increase in sports activities with the evolution of various types of sports, reintroduction of the ancient Olympics, and mass-media exposure of sports activities by radio and television coverage of sports events worldwide.

Consumer use of exercise and body-building equipment has been increasing for years. Today, with the integration of internet and mobile devices, many sports-minded individuals take advantage of mobile devices for monitoring a wide array of sports and body conditioning activities.

However, conventional weight-lifting benches and similar exercise equipment are traditionally used in a singular/manual workout mode, where the user remembers the number of repetitions and the number of sets to be performed on the equipment and the user must then keep track repetitions and other variables during his exercise session. Follow up from one or more previous exercise sessions is also frequently typically remembered and/or manually recorded. Additionally, in the case of a traditional exercise bench having a variable inclination, the inclination angle is typically limited to only a few positions/inclinations and the inclination angle is typically only manually controlled. Prior art benches and exercise equipment have not to date taken advantage of mobile devices to manage the equipment and/or workout sessions on the equipment. There are no prior art exercise benches specifically directed to hanging sit-ups having functionalities described hereinabove.

There is therefore a need for an advanced-functional, easy to use, dynamic multi-purpose exercise and body building bench, which can be integrated with mobile devices to create a system to control and monitor bench exercise sessions and managing and recording exercise sessions over time and from one bench to another.

SUMMARY OF INVENTION

According to the teachings of the current invention, there is provided a multi-purpose dynamic exercise bench for performing a training program of hanging sit-ups in an exercise session, the bench comprising: an "H"-shaped base structure configured to provide a stable support platform for the bench; an inclinable bench table having a first and second end, the bench table covered with a bench mat, upon which a user lies on his back with his head oriented towards the second end and feet secured at the first end during an exercise session; a bearing support mechanically fixed upon the base structure, the bearing support having a table rotational bearing, the bench table positioned above and mechanically fixed to the rotational bearing near the bench table second end; an inclination piston connected to the bench table and to the base structure, the inclination piston operated to provide inclination of the bench table about the rotational bearing, raising the first end of the table upward; and an interface control attached to the bench table serving to control functionality of the bench; wherein the exercise session is performed with at least one inclination of the bench table.

Preferably, an inclination angle $\alpha$ is zero when the bench table is positioned substantially parallel to the base structure and $\alpha$ equals 90 degrees when the bench table is rotated substantially perpendicular to the base structure. Most preferably, the interface control includes a microprocessor and a microcontroller, the microprocessor configured to control interface with the user and to command the microcontroller.

Typically, the $\alpha$ value is specified by the user in the interface control and the microcontroller serves to command the inclination piston to provide the table inclination $\alpha$ value. Most typically, a first number of hanging sit-up repetitions and a second number of sets of hanging sit-up repetitions is counted by at least one displacement sensor located on the bench table. Preferably, a first number of hanging sit-up repetitions and a second number of sets of hanging sit-up repetitions is counted by at least one ultrasonic sensor directed towards the table and positioned near the first end of the bench table.

According to the teachings of the current invention, there is further provided a multi-purpose exercise bench system connected with at least one mobile device and the internet to control, monitor and record a training program of hanging sit-ups in an exercise session, the system comprising; a dynamic exercise bench including: an inclinable bench table having a first and second end, the bench table covered with a bench mat, upon which a user lies on his back with his head oriented towards the second end and feet secured at the first end during an exercise session; a bearing support mechanically fixed upon the base structure, the bearing support having a table rotational bearing, the bench table positioned above and mechanically fixed to the rotational bearing near the bench table second end; an inclination piston connected to the bench table and to the base structure, the inclination piston operated to provide inclination of the bench table about the rotational bearing, raising the first end of the table upward; and an interface control attached to the bench table serving to control functionality the bench; wherein the training program includes a plurality of exercise sessions, each session having at least one inclination of the bench table.

Preferably, the interface control includes a microprocessor and a microcontroller, the microprocessor having communications means with the mobile device and with at least one server on an internet cloud. Most preferably, the at least one mobile device is at least one chosen from, the list including: a smartphone; a tablet; a personal computer; and a smart watch. Typically, the plurality of exercise sessions is identified for respective user programs, the user programs stored and retrievable in a server located in the interne cloud. Most typically, an exercise session program includes a collection of workout session parameters such as date and time of the session; user identification information, at least one bench inclination angle value specified for: a number of exercise repetitions, a number of sets of repetitions; a rest period time value between sets; elapsed time of the session and the like.

According to the teachings of the current invention, there is further provided a method of controlling and monitoring a training program of hanging sit-ups in an exercise session, the exercise session performed on a multi-purpose dynamic exercise bench system having a bench table with an inclination value "α" ranging from 0 to 90 degrees, the system connected to a mobile device and to an internet cloud, the method including the steps of: entering user details to the mobile device to log on to the bench system, the motile device chosen from the list including: a smartphone; a tablet; a personal computer; and a smart watch; specifying an exercise session, the session chosen from at least one in list including: stored user program; stored system program; and freestyle session; initiating workout session clock time; adjusting the bench table inclination to a specified cc; sensing and recording user repetitions, sets, and times without movement; readjusting the bench table inclination to another specified α and repeating step e iteratively until all specified α values are used; signaling and end of

LIST OF FIGURES

The invention is herein described, by way of example only, with reference to the accompanying drawings, wherein.

DETAILED DESCRIPTION

Embodiments of the present invention relate to sports conditioning equipment and specifically to a multi-purpose exercise and body building bench and system directed to performing hanging sit-ups.

Embodiments of the current invention provide a multi-purpose exercise and body building bench integrated into an overall system having at least one mobile device to allow dynamic management of the bench and/or workout sessions performed on the bench.

Figure 1A:
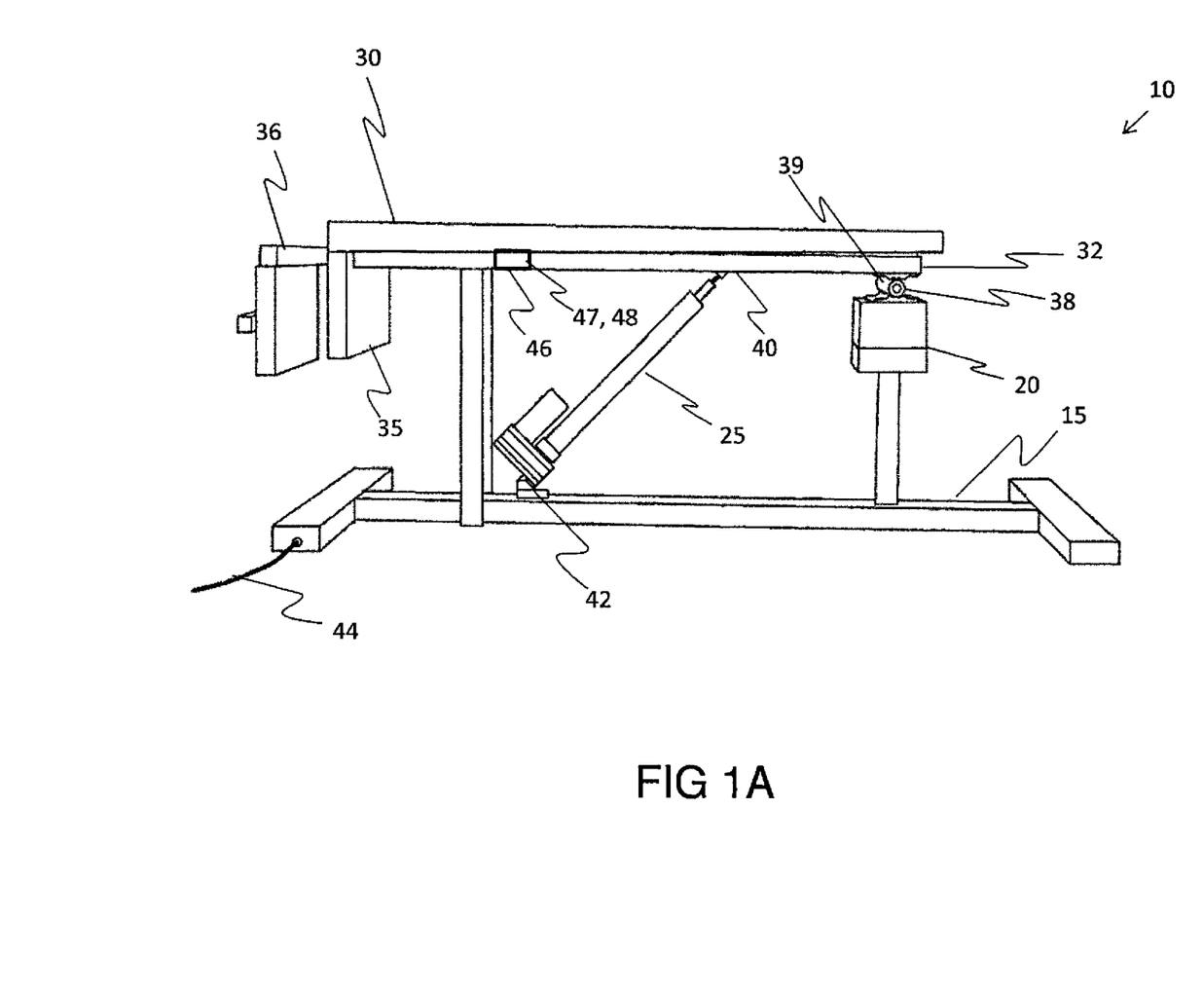
FIG. 1A is a perspective view of a multi-purpose exercise and body building bench, in accordance with embodiments of the current invention.

Reference is currently made to FIG. 1, which is a perspective view of a multi-purpose exercise and body building bench 10, in accordance with embodiments of the current invention. Multi-purpose exercise and body building bench 10 includes: an "H"-shaped base structure 15; a bearing support 20; an inclination piston 25; a bench mat 30; an inclinable bench table 32; two supporting stands 34; a stationary leg support 35; a translatable leg support 36; a table rotational bearing 38; a piston upper bracket 40; a piston lower bracket 42; an electrical cord 44; and an interface control 46.

"H"-shaped base structure 15, having a longer central member and two shorter perpendicularly-oriented members as shown in the figure, provides a stable support for multi-purpose exercise and body building bench 10. The base structure is typically positioned on a flat, stable and strong floor surface (not, shown in the figure). "H"-shaped base structure 15, has approximate dimensions of 160 cm length by 80 cm width by 5 cm height. The approximate weight range of the multi-purpose exercise and body building bench ranges from 180 to 240 kg. The stability offered by the "H"-shaped base structure, coupled with the overall weight of the multi-purpose exercise and body building bench serve as a stable support platform for exercise and bench operation, as described hereinbelow.

Inclinable bench table 32 is part of the structure of the bench, as described hereinbelow, with the bench table and other structural parts of the bench being fabricated from strong metallic materials, such as, but not limited to: steel and iron. Bench table 32 measures approximately 140 cm long by 40 cm wide by 3 cm thick and has first and second ends. As is further described below, a user places his feet near the first end of the table and the user's head is directed to the second end of the table and the bench table is inclined to allow hanging sit-ups to be performed.

Bench mat 30 typically completely covers bench table 32 and the bench mat is fabricated from durable materials, such as, but not limited to: polymer and cloth. Bench mat 30 is similar to a firm exercise/yoga mat, as known in the art, providing firm and comfortable support for a user (not shown in the figure) lying on his back on bench 10, with the user's knees bent and the user's legs placed between stationary leg support 35 and translatable leg support 36, at the first end of the bench table. At least one displacement sensor (not shown in the figure) is located on bench table 32 under the bench mat, the displacement sensor functioning to sense user exercise movement and repetitions, as described further hereinbelow. Alternatively, the at least one displacement sensor is integrated into bench mat 30.

Stationary leg support 35 is mechanically fixed to a first end of bench table 32, as shown in the figure. Translatable leg support 36 is connected to the stationary leg support by means of a strong shaft (not visible in the current figure, but visible in FIGS. 2 and 3, hereinbelow) and the translatable leg support may be manually translated closer or further away from the stationary leg support and locked into position using mechanical means, as known in the art, according to the user's need. Additionally or optionally, translation and locking of the translatable leg support is affected by a motor (not shown in the figure).

Bearing support 20 is mechanically fixed upon base structure 15, the bearing support providing stable, stationary support for table rotational bearing 38. Table rotational bearing 38 is mechanically fixed to bench table 32 near the second end of the table. Two supporting stands 34 are additionally mechanically fixed upon the base structure, the supporting stands providing stable support for bench table 32, which may rest upon vertically-rising supporting stands 34, as shown in the figure. The two supporting stands are not mechanically connected to bench table 32, as further described hereinbelow.

Piston upper and lower brackets 40 and 42 are mechanically fixed to bench table 32 and the "H"-shaped base 15, respectively. Inclination piston 25 is diagonally-configured beneath lower bench member 32, as shown in the figure, and the inclination piston is connected to the "H"-shaped base by means of piston lower bracket 42. The inclination piston is connected to bench table 32 by means of piston upper bracket 40. Respective connections of piston 25 to the piston upper and lower brackets, allow for limited rotational movement (only) of piston 25 about the respective brackets.

Interface control 46 is attached to a side of bench table 32, the position of interface control located to allow a user, lying on his back on the bench, or a user standing next to the bench when it is in a configuration as shown in the current figure, to manipulate one or more functions of the interface control, as further described hereinbelow. A microcontroller 47 is configured within or in electrical and signal connection with the interface control.

Microcontroller 47 has additional electrical and signal connections with the at least one displacement sensor noted hereinabove and with any optional or additional components, such as but not limited to: inclination piston 25 and; the motor which effects translation and locking of the translatable leg support described hereinabove. The microcontroller is further electrically connected to electrical cord 44, the electrical cord typically being connected to mains voltage or to any other appropriate power source.

Microprocessor 48 is configured within or in electrical and signal connection with the interface control, and in electrical and signal connection with the microcontroller. The microprocessor serves to control interface with the user and the microcontroller and to control overall data management and communications. The microprocessor has wireless communication capabilities, such as but not limited to: Cellular; Wi-Fi; and Bluetooth. Additional discussion of the interface control and functionalities of the multi-purpose exercise and body building bench 10 are discussed hereinbelow.

An exemplary microcontroller 47 is the Arduino Uno, manufactured by Arduino S.r.l., (https://store.arduino.cc/arduino-uno-rev3). An exemplary microprocessor 28 is the Raspberry pi 3, Raspberry Pi Foundation UK Registered Charity 1129409.

Inclination piston 25 is operated to provide an inclination angle of bench table 32 by the piston extending itself, as known in the art, thereby raising the bench table rotatably about table rotational bearing 38. A bench table rotational angle "$\alpha$" is defined between 0 and 90 degrees. When $\alpha$=0 degrees, corresponding to the configuration shown in the current figure, the bench table is substantially parallel to "H"-shaped base 15. When the inclination piston is fully extended, the bench table is fully rotated to a position substantially perpendicular to "H"-shaped base 15, meaning $\alpha$=90 degrees. Real time feedback to the microprocessor regarding inclination angle $\alpha$ is provided by electronics within the inclination piston (not shown in the figure) sensing extension of inclination piston 25.

An exemplary inclination piston 25 is the PA-04-40-400 Linear Actuator IP66, manufactured by Progressive Automations, 160-6691 Elmbridge way Richmond, BC, V7C 4N1, Canada.

Additionally or optionally, real time feedback to the microprocessor regarding inclination angle $\alpha$ is sensed/measured by a rotational sensor 39, which is integrated into bearing 36, the rotational sensor also being connected with microprocessor 48. The multi-purpose bench, when in a flat, non-inclined position ($\alpha$=0 degrees) has dimensions of approximately 160 cm length and a height of approximately 50 cm.

Operation of the inclination piston, starting from $\alpha$=0 is typically initiated with the user lying on his back on bench 10, substantially parallel to the floor, as described hereinabove. Operation continues with the bench table being progressively raised, the user being oriented feet-upward, and with the bench table raised to a last position where the user is oriented head-downward, substantially perpendicular to the floor, namely the $\alpha$=90 position. As is described further hereinbelow, a workout session can be made progressively more difficult as a is changed in the range of 0 to 90 degrees.

Figure 1B:
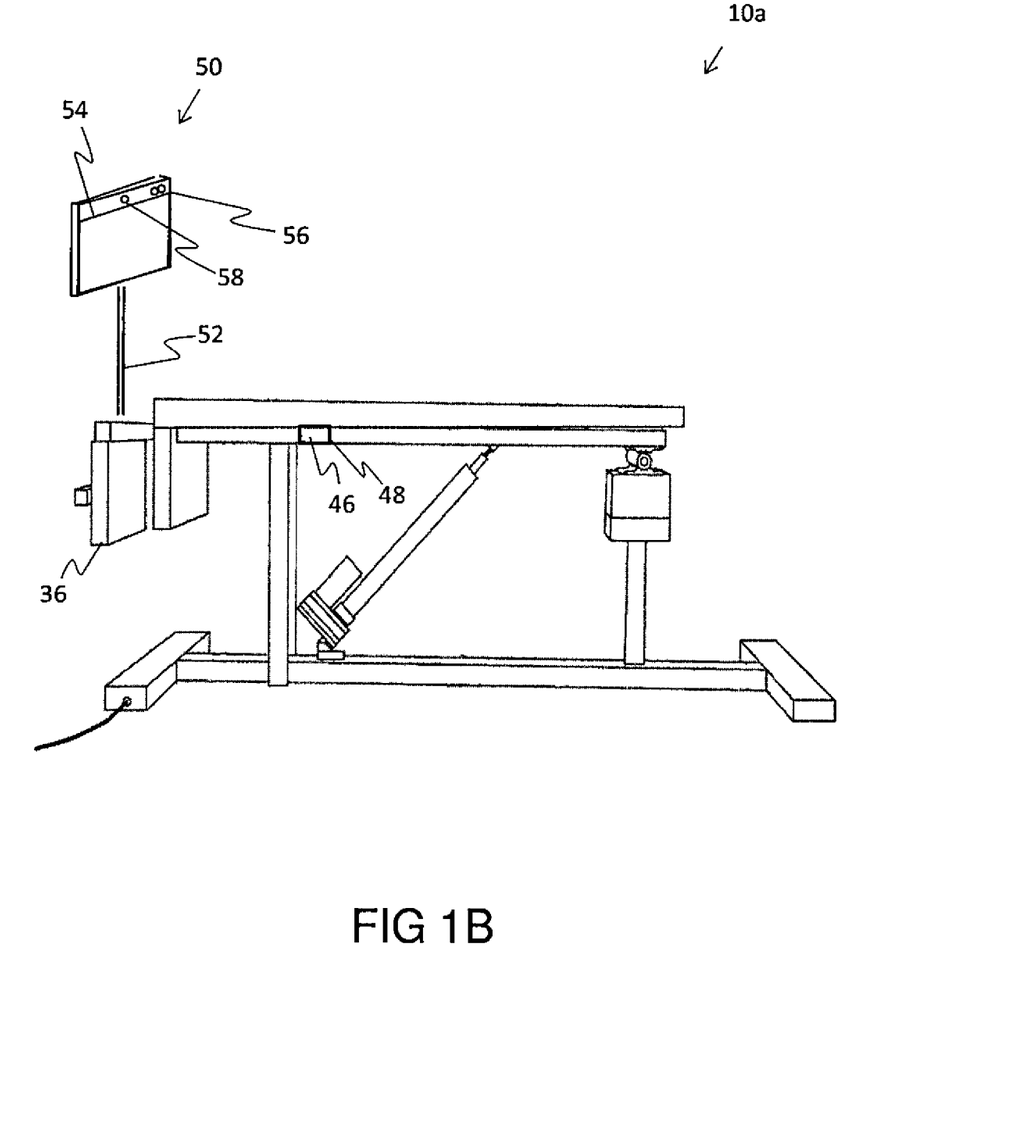
FIG. 1B is a perspective view of an alternate configuration multi-purpose exercise and body building bench, in accordance with embodiments of the current invention.

Reference is currently made to FIG. 1B, which is FIG. 1B is a perspective, schematic representation of an alternate configuration multi-purpose exercise and body building bench 10a, having an alternate optional interface control 50, in accordance with embodiments of the current invention. Alternate configuration bench 10a of FIG. 1B is identical in notation, configuration, and functionality to bench 10 shown in FIG. 1, except as described hereinbelow, and elements indicated by the same reference numerals and/or letters are generally identical in configuration, operation, and functionality as described hereinabove.

Alternate optional interface control 50 connects electrically and electronically with interface control 46. Alternate optional interface control 50 may be used in place of or in parallel to interface control 46, as described hereinbelow. The alternate optional interface control includes: a structural member 52; a display monitor 54; an ultra-sonic sensor 56 and a power switch 58. Structural member 52 serves to hold and position the display monitor, sensor and power switch to translatable leg support 36, so that the display monitor is substantially facing the user when lying on the bench.

Ultrasonic sensor 56 serves to sense user exercise movement and repetitions as known in the art—in similar fashion as described hereinabove with regard to the displacement sensor. Ultrasonic sensor 56 may be operated independently or in parallel to the displacement sensor. One advantage afforded by the ultrasonic sensor is that it does not function with contact, as described regarding the displacement sensor hereinabove. This aspect could be advantageous at high α values (approaching 90 degrees), when the user is suspended nearly vertically on the table and is his weight is not bearing upon the table (i.e. bearing upon the previously-described displacement sensor).

Figure 2:
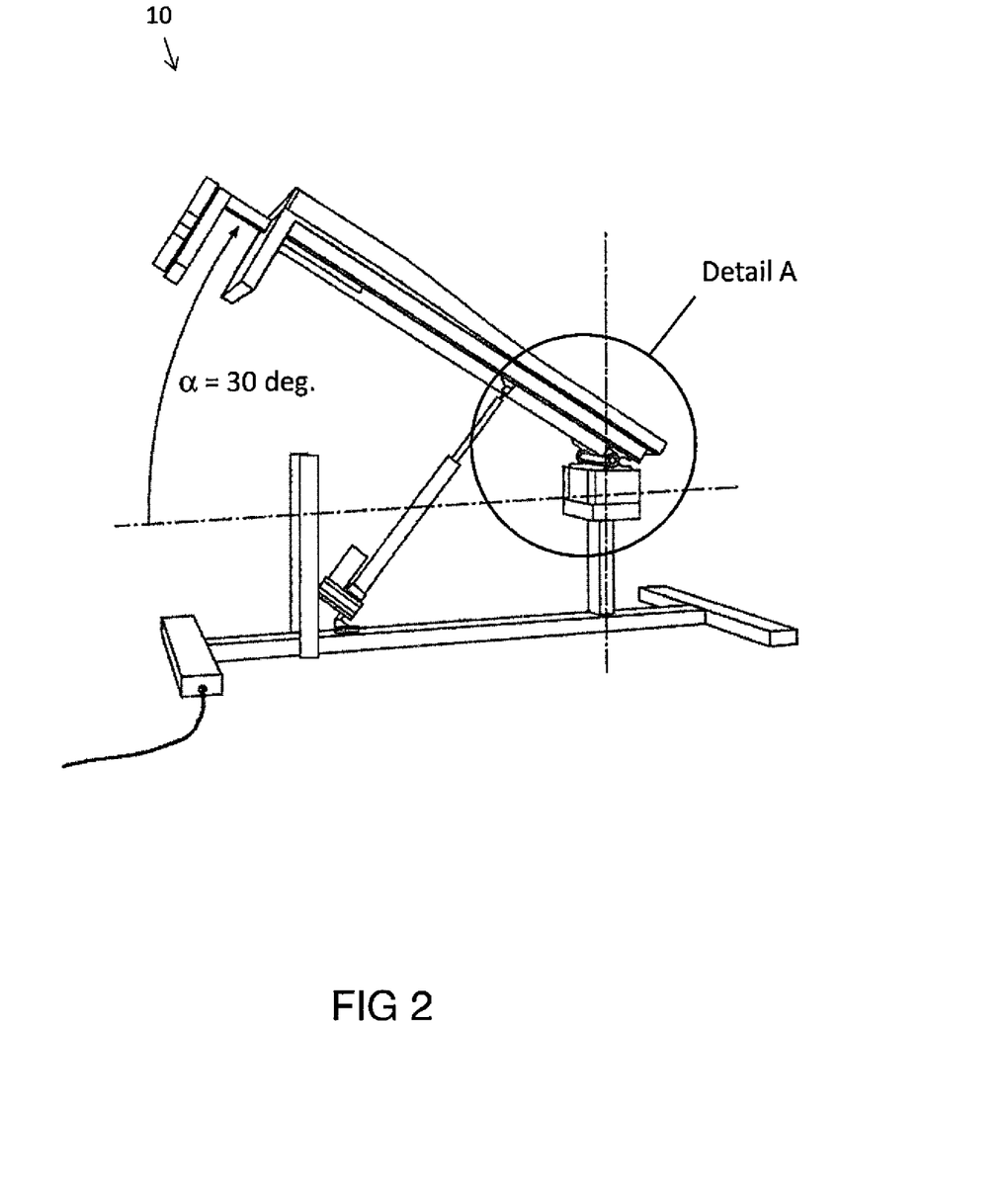
FIGS. 2 and 3 are perspective side views of the multi-purpose exercise and body building bench with inclination angles (a) of 30 degrees and 90 degrees, respectively, of the multi-purpose exercise and body building bench shown in FIG. 1, in accordance with embodiments of the current invention.
Figure 3:
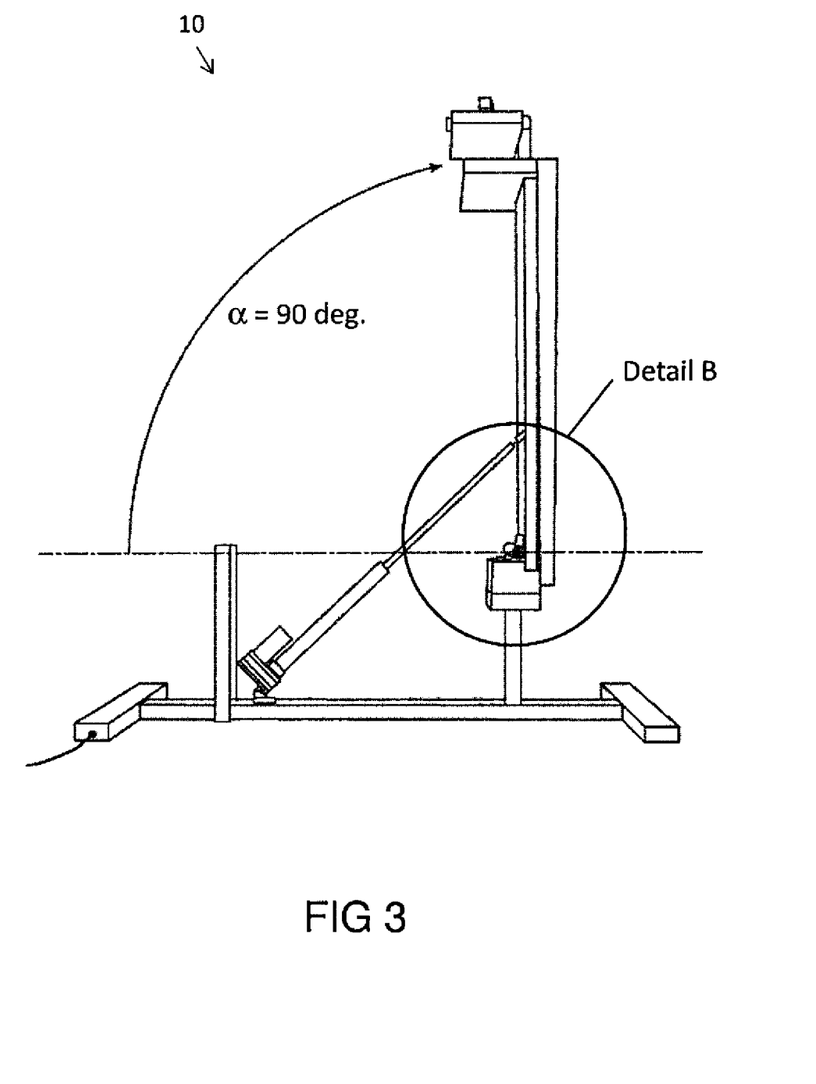

Reference is currently made to FIGS. 2 and 3, which are perspective side views of multi-purpose exercise and body building bench 10, showing inclination angles (α) of 30 degrees and 90 degrees, respectively, of the multi-purpose exercise and body building bench shown in FIG. 1, in accordance with embodiments of the current invention. Bench 10 of FIGS. 2 and 3 is identical in notation, configuration, and functionality to that shown in FIG. 1 and elements indicated by the same reference numerals and/or letters are generally identical in configuration, operation, and functionality as described hereinabove.

Figure 4A:
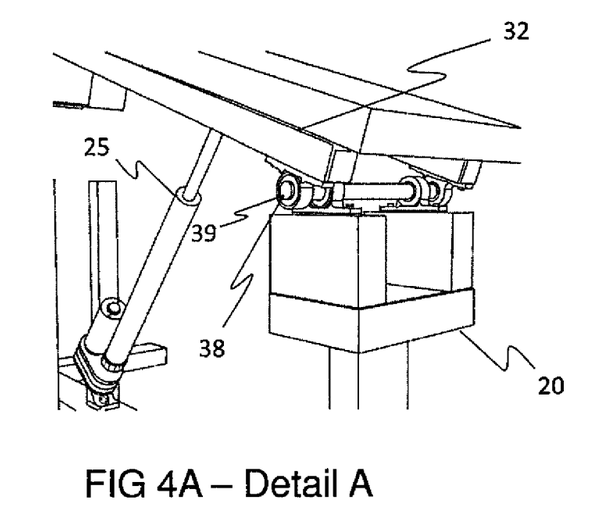
FIGS. 4A and 4B are perspective detailed views A and B indicated in FIGS. 2 and 3, respectively, in accordance with embodiments of the current invention.
Figure 4B:
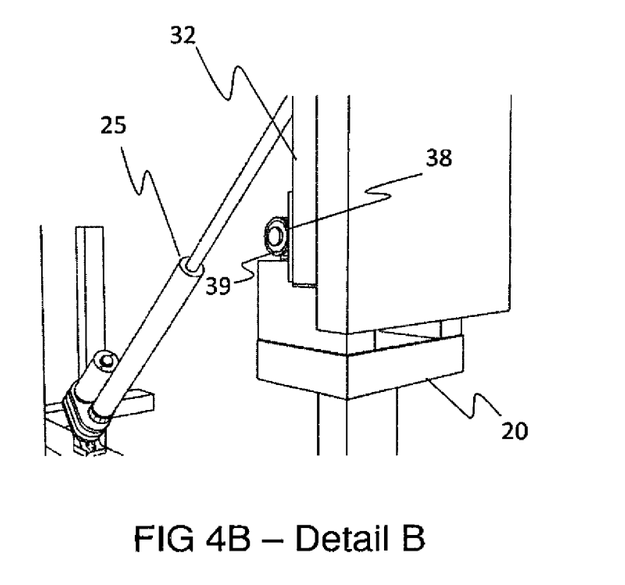

The two inclination angles shown in referenced figures are representative of a substantially continuous range of angles from α=0 to 90 degrees, as described hereinabove. Details A and B, indicated respectively in FIGS. 2 and 3, are shown in FIGS. 4A and 4B, which are corresponding perspective detailed views about bench rotational bearing 38, with bench angles α=30 and 90 degrees, respectively, in accordance with embodiments of the current invention. Note in FIGS. 2, 3, 4A, and 4b the increased extension of inclination piston 25 to achieve increased bench angles.

As noted hereinabove, multi-purpose exercise and body building bench 10 has a number of electronic/electrical components and also can function as part of a system having software control and communications capabilities.

Figure 5:
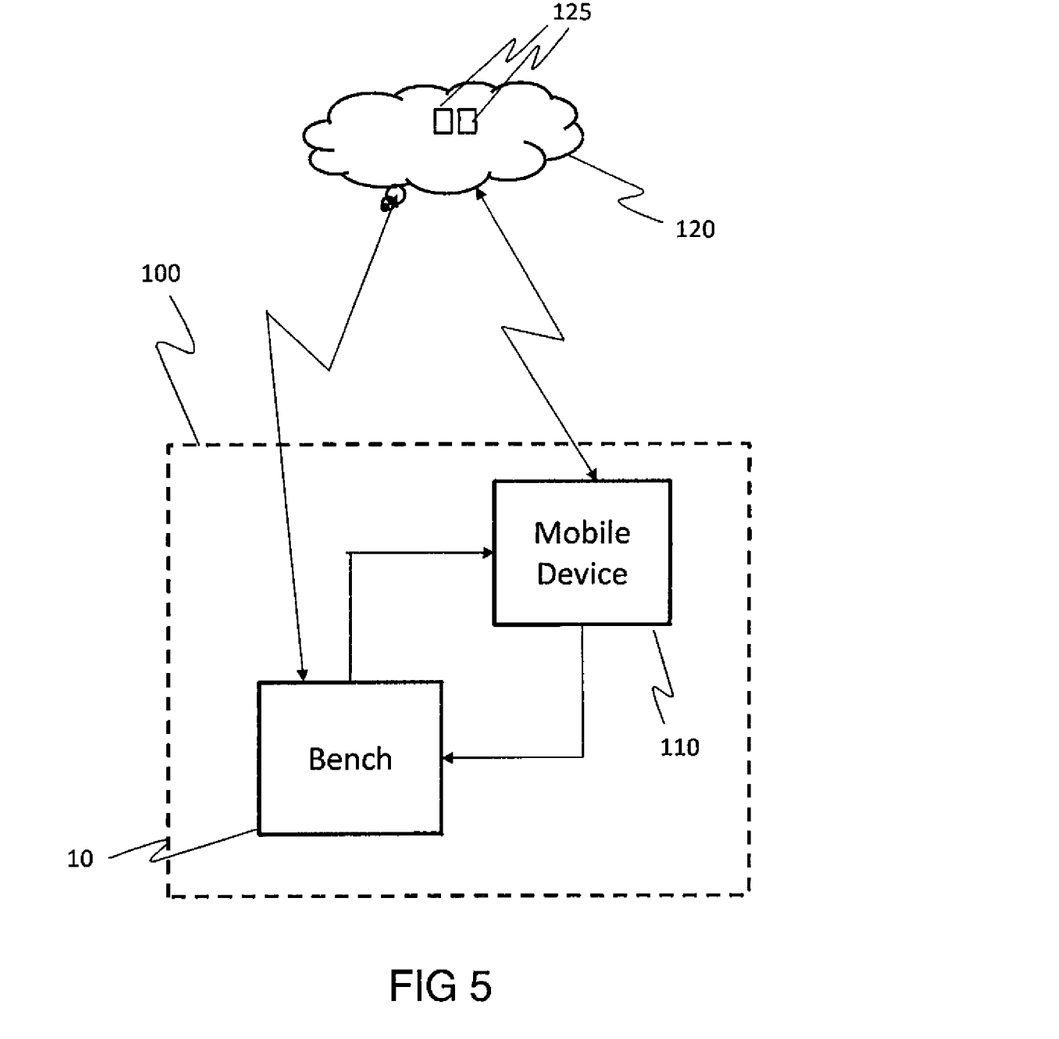
FIG. 5 is a block diagram of a multi-purpose exercise bench system, in accordance with embodiments of the current invention.

Reference is currently made to FIG. 5, which is a block diagram of a multi-purpose exercise bench system 100 in accordance with embodiments of the current invention.

Multi-purpose exercise bench system 100 includes multi-purpose exercise and body building bench 10 and at least one mobile device 110. Bench 10 of FIG. 5 is identical in notation, configuration, and functionality to that shown in FIGS. 1-3 and elements indicated by the same reference numerals and/or letters are generally identical in configuration, operation, and functionality as described hereinabove.

Bench 10 and at least one mobile device 110 communicate with each other and with an internet cloud 120, as shown in the figure. The term "internet cloud", as used in the specification and claims hereinbelow, is intended to mean the "internet", as known in the art. As such, connections to the internet cloud are intended to mean wired and/or wireless connections to the internet including, but not limited to: cable, DSL, and mobile data. One or more dedicated servers 125 are located in internet cloud 120, the servers functioning to receive, store, and download information, as described hereinbelow. One or more dedicated servers 125 are referred to collectively hereinbelow simply as "server" or "the server", as known in the art.

Multi-purpose exercise bench system 100 includes software to plan, control and track exercise sessions over time, enabling a dynamic/interactive training program for the user. At least one mobile device 110 serves as user interface (in addition to or in place of interface control 46, as described in FIG. 1) to operate and program functionalities of multi-purpose exercise and body building bench 10. Additionally, one or more dedicated applications running on the mobile device allow the user to specify workout sessions and session details and to invoke transferring specific workout session information (herein called a "workout program") to and from the server to multi-purpose exercise and body building bench 10. Typically, the user specifies/defines a workout program and defines parameters of the program either by: (1) manually inputting parameters (referred to hereinbelow as "freestyle workout") or by; (2) downloading a user-defined or a system-defined workout program, both as described further hereinbelow. Once multi-purpose exercise bench system 100 is activated and communication is established between at least one mobile device 110 and bench 10, the user must initially log onto a software interface, typically residing in at least mobile device 110.

Figure 6:
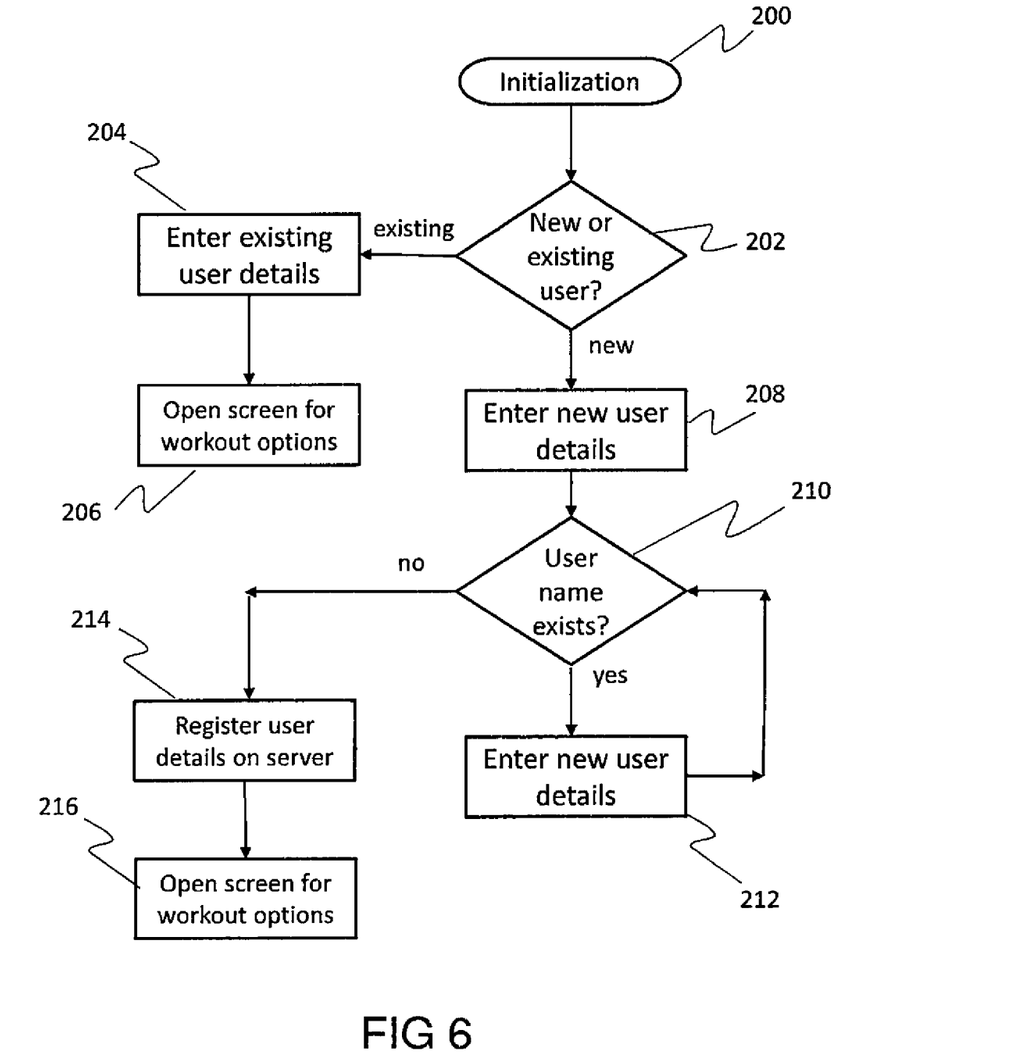
FIG. 6 is logic flow diagram, showing the steps of logging onto the software interface of the multi-purpose exercise bench system, in accordance with embodiments of the current invention.

Reference is currently made to FIG. 6, which is a logic flow diagram, showing the steps of logging onto the software interface of the multi-purpose exercise bench system, in accordance with embodiments of the current invention. Step 200 "Initialization" includes system activation and communications as noted hereinabove and is followed by step 202 "New or existing user", where the user is queried to identify his status. In step 204 "Enter existing user details", an existing user enters his user credentials (typically user name and password, as known in the art) to proceed to step 206 and gain access to "Open screen for workout options". The user is now ready to proceed with workout options, described hereinbelow.

Following identification as a new user in step 202, the new user enters his user credentials in step 208 "Enter new user details". In step 210 "User name exists", the user name/password combination entered in step 208 is checked in the user data base (typically maintained on the server). If the user name does not exist—meaning this is a new user name/password combination—control is transferred to step 206 "Open screen for workout options". The user is now ready to proceed with workout options, described hereinbelow.

If a new user enters an existing user name/password combination, he is prompted in step 212 "Enter new user details" to enter another user name/password combination and control is transferred back to step 210 to recheck the new user name/password combination. Assuming (eventually) the new user logs on satisfactorily, control proceeds as described hereinabove.

Figure 7:
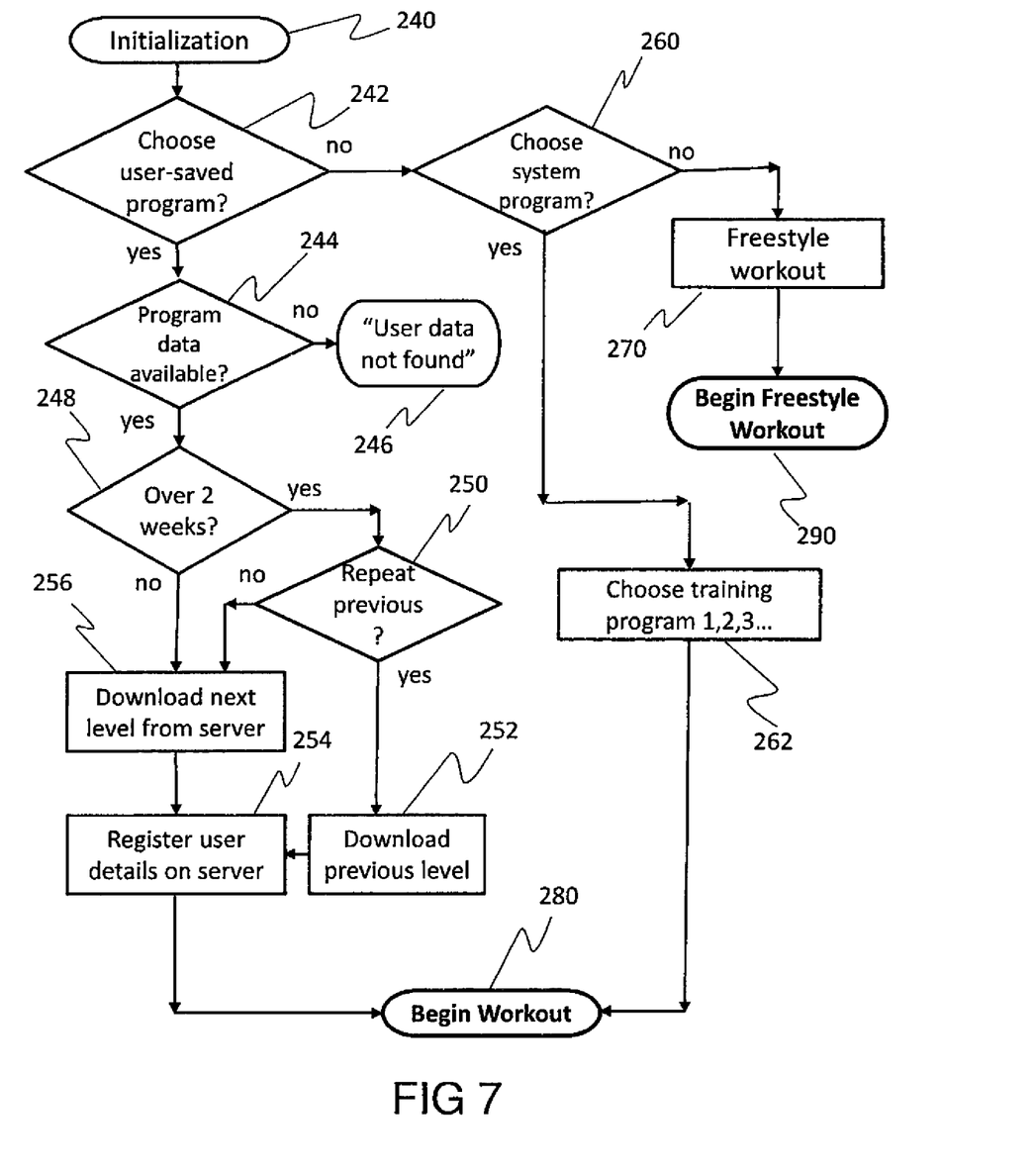
FIG. 7 is a is logic flow diagram, showing the steps of choosing a workout session program or specifying a freestyle workout on the multi-purpose exercise bench system, in accordance with embodiments of the current invention.
Figure 8:
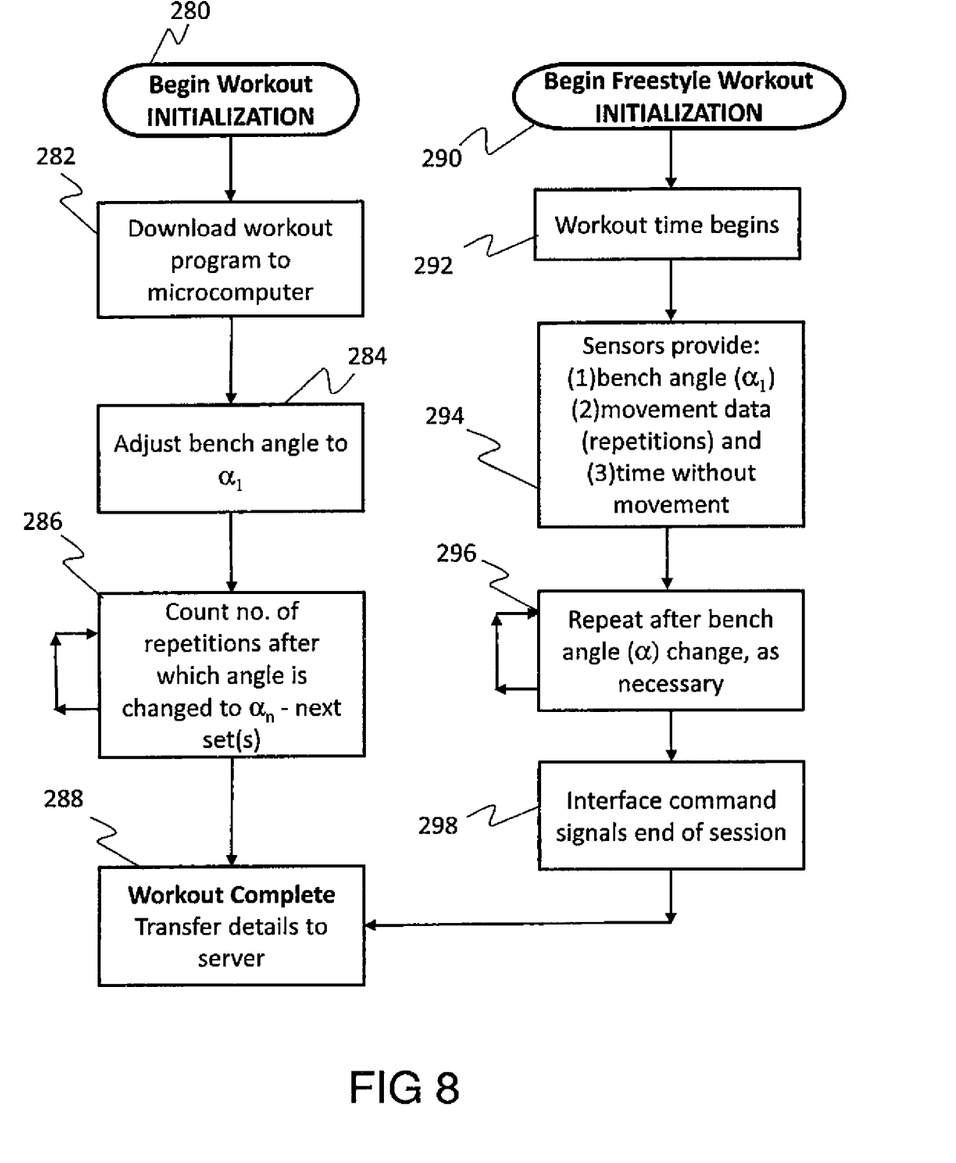
FIG. 8 is a condensed logic flow diagram, showing the steps of a downloaded workout program or a freestyle working on the multi-purpose exercise and body building bench system, in accordance with embodiments of the current invention.

Reference is currently made to FIGS. 7 and 8, which are, respectively: a logic flow diagram, showing the steps of choosing a workout session program or specifying a freestyle workout on the multi-purpose exercise bench system; and in accordance with embodiments of the current invention; and a condensed logic flow diagram, showing the steps of a downloaded workout program or a freestyle working on the multi-purpose exercise and body building bench system, in accordance with embodiments of the current invention.

Successful logging onto the software interface, as described in FIG. 6 hereinabove, is encapsulated in step 240 "Initialization" in FIG. 7. Control is then transferred to step 242 "Choose user-saved program?". A user-saved program is a collection of workout session parameters for a specific user, as defined hereinabove, namely, a repetitive sequence of:

setting a bench inclination position/angle;
performing a plurality of exercise repetitions and/or sets of repetitions;
having one or more optional rest periods (typically less than 60 seconds in duration between sets and/or sequence repetitions); and repeating the sequence above, starting with another inclination angle.

Upon choosing a user-saved program, in step 244 "Program data available?", the system performs a check to verify the data is available. (Possible reasons, inter alia, for no data availability could be: data is corrupt or somehow erased; and data is not downloaded from the server to the bench.) If no data is available, control is transferred to step 246 "User data not found", the user receives an appropriate message, and control is typically returned to step 242 (not indicated in the figure) for the user to re-enter another program.

If program data is available, in step 248 "Over 2 weeks" the system checks if more than two weeks have elapsed since the last time the program was accessed and run—meaning the user exercised according to the program. If over 2 weeks have passed, control is transferred to step 250 "Repeat previous?", meaning the user is queried to repeat a previous level program, which has data for running a less aggressive workout session level than the program level specified for today's workout. Usually, a training program includes workout sessions having increasing difficulty over time. However, if for any reason, the user does not proceed with workouts in a prescribed time (usually once every few days) and an extended period passes with no workout session, it is advisable to "reset" or modify the training schedule.

If in step 250 the user answers "yes", in step 252 "Download previous level", a previous (and usually lower) level program is downloaded. Control is then transferred to step 254 "Register user details on server", meaning time, date, and any other necessary user data is registered and the workout then begins in step 280 "Begin Workout".

If in step 248 above, 2 weeks or less have elapsed since the last workout, in step 256 "Download next level from server", the next level (usually more difficult) program is downloaded, control is then transferred to step 254 "Register user details on server", as hereinabove, and the workout begins in step 280 "Begin Workout". Note that the 2-week period defined above is for illustration purposes only. It is possible to change the time-elapsed period to less than or more than 2 weeks, depending on the training program and on user prerogative.

If, in step 242 above a user-saved program is not chosen, in step 260 "Choose system program?" the user is prompted to choose between a series of predefined ("system") workout programs or a freestyle workout program, as described hereinbelow. If the user chooses a system program, control is transferred to step 262 "Choose training program 1, 2, 3 . . . " and the user may choose from an array of pre-saved system workout programs. Following this step (not indicated in the figure) time, date, and any other necessary user data is registered and the workout then begins in step 280 "Begin Workout".

If in step 260 a system program is not chosen, the user proceeds to step 270 "Freestyle workout" and then proceeds to step 290, "Begin Freestyle Workout". A freestyle workout is typically a one-time (or possibly a first-time) workout session where all parameters are entered manually—meaning they have not been previously programmed.

In FIG. 8, two possible "initialization" steps are presented—continuing from FIG. 7—namely: step 280 "Begin Workout INITIALIZATION" and step 290 "Begin Freestyle Workout INITIALIZATION".

Starting with step 280—namely a workout session based on a downloaded workout program—control is transferred to step 282 "Download workout program to microcomputer". The chosen workout program is downloaded to the bench microcomputer and a time stamp of the current workout beginning time is performed. In step 284 "Adjust bench angle to $\alpha_1$", the bench table is inclined to the initial inclination angle of the workout program. Following this, in step 286 "Count no. of repetitions after which angle is changed to $\alpha_n$—next set(s)" the user begins the workout, performing repetitions, which are sensed (and counted) by the at least one displacement sensor described in FIG. 1 hereinabove. Part of step 286 are any subsequent bench table inclination angle change(s) and associated repetitions and/or sets, indicated by the looped return arrow in the figure. When all repetitions and/or sets of the workout program are completed, control is transferred to step 288 "Workout Complete: Transfer details to server". The workout is complete; the inclination value of the bench is returned to $\alpha=0$ to allow the user to dismount; and all details of the program, including overall time, timing of all repetitions and sets versus all respective $\alpha$ values used are transferred to the server on the cloud.

Starting with step 290—namely a Freestyle workout—control is transferred to step 292 "Workout time begins". In step 294 "Sensors provide: (1) bench angle $\alpha_1$ (2) movement data (repetitions) and (3) time without movement"—as part of any workout session, the parameters noted hereinabove are sensed and recorded. In the case of a freestyle workout, however, since there is no previously programmed/recorded workout information, all workout parameters are based on values input by the user through the interface control described hereinabove in FIG. 1. In step 296 "Repeat after bench angle ($\alpha$) change, as necessary", the freestyle workout continues and subsequent bench table inclination angle change(s) and associated repetitions and/or sets, indicated by the looped return arrow in the figure, take place and are recorded—as in the description of a workout program hereinabove. In step 298 "Interface command signals end of session", the user gives a command on the interface control ending the freestyle workout session. At this point, control is transferred to step 288, as described hereinabove.

It is noted that mobile device 110 identified hereinabove need not necessarily be a dedicated device to interact with multi-purpose exercise bench system 100, but that software loaded onto more than one mobile device, used in parallel with proper user credentials, as known in the art, likewise allows control and interactivity with system 100.

It will be appreciated that the above descriptions are intended only to serve as examples, and that many other embodiments are possible within the scope of the present invention as defined in the appended claims.

The invention claimed is:

1. A multi-purpose dynamic exercise bench for performing a training program of hanging sit-ups in an exercise session, the bench comprising:
    an "H"-shaped base structure configured to provide a stable support platform for the bench;
    an inclinable bench table having a first and second end, the bench table covered with a bench mat on a table surface, upon which a user lies on his back with his head oriented towards the second end, with the user's knees bent and the user's feet secured at the first end, during an exercise session, between a stationary leg support and a translatable leg support, the stationary and translatable leg supports positioned beneath the table surface, with the translatable leg support adapted to be locked into position;
    a bearing support mechanically fixed upon the base structure, the bearing support having a table rotational bearing, the bench table positioned above and mechanically fixed to the rotational bearing near the bench table second end;

an inclination piston connected directly to the bench table and to the base structure, the inclination piston operated to provide inclination of the bench table about the rotational bearing, raising the first end of the table upward;

an inclination angle α is zero when the bench table is positioned substantially parallel to the base structure and a equals 90 degrees when the bench table is rotated substantially perpendicular to the base structure; and an interface control attached to the bench table serving to control functionality of the bench;

wherein the exercise session is performed with at least one inclination of the bench table.

2. The multi-purpose dynamic exercise bench of claim 1, wherein the interface control includes a microprocessor and a microcontroller, the microprocessor configured to control interface with the user and to command the microcontroller.

3. The multi-purpose dynamic exercise bench of claim 2, wherein the α value is specified by the user in the interface control and the microcontroller serves to command the inclination piston to provide the table inclination α value.

4. The multi-purpose dynamic exercise bench of claim 1, wherein a first number of hanging sit-up repetitions and a second number of sets of hanging sit-up repetitions is counted by at least one displacement sensor located on the bench table.

5. The multi-purpose dynamic exercise bench of claim 1, wherein a first number of hanging sit-up repetitions and a second number of sets of hanging sit-up repetitions is counted by at least one ultrasonic sensor directed towards the table and positioned near the first end of the bench table.

6. A multi-purpose exercise bench system connected with at least one mobile device and the internet to control, monitor and record a training program of hanging sit-ups in an exercise session, the system comprising;

a dynamic exercise bench including:

an inclinable bench table having a first and second end, the bench table covered with a bench mat on a table surface, upon which a user lies on his back with his head oriented towards the second end, with the user's knees bent and the user's feet secured at the first end, during an exercise session, between a stationary leg support and a translatable leg support, the stationary and translatable leg supports positioned beneath the table surface, with the translatable leg support adapted to be locked into position;

a bearing support mechanically fixed upon the base structure, the bearing support having a table rotational bearing, the bench table positioned above and mechanically fixed to the rotational bearing near the bench table second end;

an inclination piston connected directly to the bench table and to the base structure, the inclination piston operated to provide inclination of the bench table about the rotational bearing, raising the first end of the table upward;

an inclination angle α is zero when the bench table is positioned substantially parallel to the base structure and a equals 90 degrees when the bench table is rotated substantially perpendicular to the base structure; and an interface control attached to the bench table serving to control functionality of the bench;

wherein the training program includes a plurality of exercise sessions, each session having at least one inclination of the bench table, with a ranging from 0 to 90 degrees.

7. A system according to claim 6, wherein the interface control includes a microprocessor and a microcontroller, the microprocessor having communications means with the mobile device and with at least one server on an internet cloud.

8. A system according to claim 7, wherein the at least one mobile device is at least one chosen from the list including: a smartphone; a tablet; a personal computer; and a smart watch.

9. A system according to claim 7, wherein the plurality of exercise sessions is identified for respective user programs, the user programs stored and retrievable in a server located in the internet cloud.

10. A system according to claim 9, wherein an exercise session program includes a collection of workout session parameters including: date and time of the session; user identification information, at least one bench inclination angle value specified for: a number of exercise repetitions, a number of sets of repetitions; a rest period time value between sets; elapsed time of the session.

11. A method of controlling and monitoring a training program of hanging sit-ups in an exercise session, the exercise session performed on a multi-purpose dynamic exercise bench system having a bench table supported by an "H" shaped base structure, the bench table having:

a first and second end, the bench table covered with a bench mat on a table surface, upon which a user lies on his back with his head oriented towards the second end, with the with the user's knees bent and the user's feet secured at the first end, during an exercise session, between a stationary leg support and a translatable leg support, the stationary and translatable leg supports positioned beneath the table surface, with the translatable leg support adapted to be locked into position; and an inclination value "α" ranging from 0 to 90 degrees, with α=0 degrees when the bench table is positioned substantially parallel to the base structure and α=90 degrees when the bench table is rotated substantially perpendicular to the base structure, the system connected to a mobile device and to an internet cloud, the method including the steps of:

a. entering user details to the mobile device to logon to the bench system, the mobile device chosen from the list including: a smartphone; a tablet; a personal computer; and a smart watch;

b. specifying an exercise session, the session chosen from at least one in list including: stored user program; stored system program; and freestyle session;

c. initiating workout session clock time;

d. adjusting the bench table inclination to a specified α;

e. sensing and recording user repetitions, sets, and times without movement f. readjusting the bench table inclination to another specified α and repeating step e iteratively until all specified α values are used;

g. signaling and end of the exercise session; and h. transferring exercise session details to at least one server located on the internet cloud.

* * * * *